No. 699,414. Patented May 6, 1902.
C. J. REED.
METHOD OF TREATING SOLUTIONS OF SALTS.
(Application filed Aug. 1, 1901.)
(No Model.)
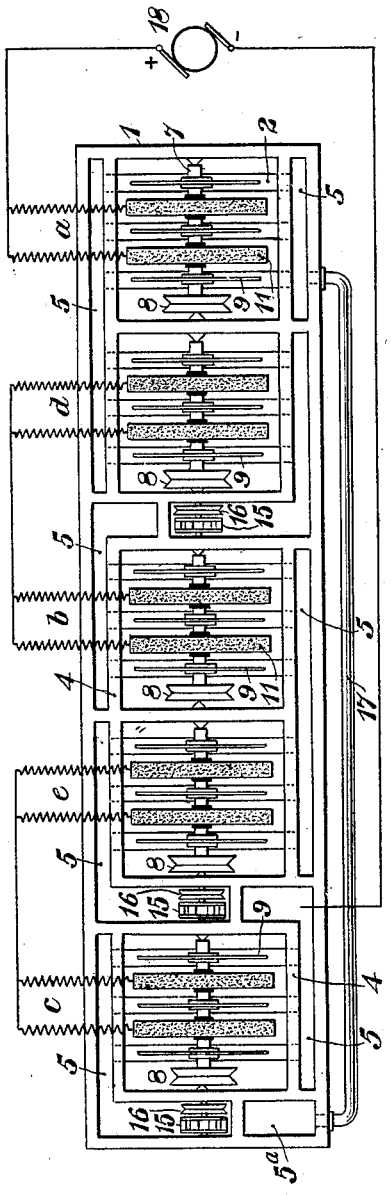
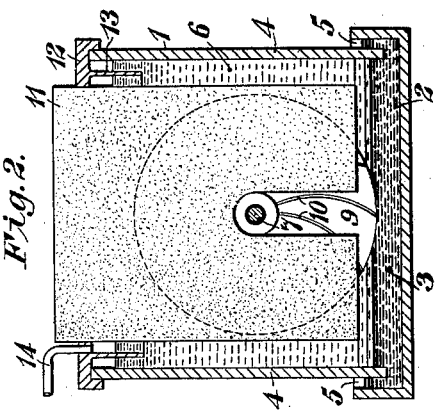
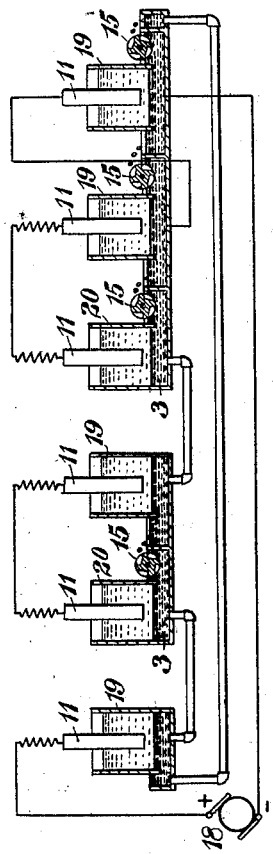
WITNESSES:
C. L. Belcher
J. C. Morse
INVENTOR
Charles J. Reed
BY Wesley G. Carr
ATTORNEY.

UNITED STATES PATENT OFFICE.

CHARLES J. REED, OF PHILADELPHIA, PENNSYLVANIA.

METHOD OF TREATING SOLUTIONS OF SALTS.

SPECIFICATION forming part of Letters Patent No. 699,414, dated May 6, 1902.

Application filed August 1, 1901. Serial No. 70,535. (No specimens.)

*To all whom it may concern:*

Be it known that I, CHARLES J. REED, a citizen of the United States, residing at Philadelphia, in the county of Philadelphia and State of Pennsylvania, have invented a new and useful Improvement in Methods of Treating Solutions of Salts, of which the following is a specification.

My invention relates to the electrolytic treatment of solutions of salts in the presence of mercury; and it has for its object to provide a method whereby the desired treatment may be effected expeditiously and by a minimum expenditure of time and labor.

My invention consists in subjecting a solution containing one or more salts to the action of an electric current in a plurality of reducing-cells that are electrically connected in series with a less number of oxidizing-cells and in so combining the cells in their operation that a minimum amount of electrical energy from the main source may produce a maximum output of the products resulting from the electrolytic action.

The specific process to which my invention is particularly applicable is the manufacture of sodium hydrate and chlorin from an aqueous solution of sodium chlorid, and for convenience I shall describe my invention as utilized in practicing this process; but without any intention, however, of limiting the invention to the treatment of this specific electrolyte, since it is susceptible of use in connection with solutions of other salts.

In the manufacture of sodium hydrate from aqueous solutions of sodium chlorid as heretofore usually practiced a tilting vessel having a body of mercury in its lower part and a partition extending downward into the body of mercury, but not to the bottom of the vessel, so as to divide the vessel into two compartments or cells, has been employed. In one of the cells is placed the aqueous solution of sodium chlorid and in the other cell another suitable electrolyte, such as water, and into each liquid projects a carbon electrode. The transmission of electric current from a suitable source through the cells from the carbon electrode in the sodium-chlorid cell to the carbon electrode in the other cell through electrolytes and the mercury serves to decompose the sodium-chlorid solution, and the sodium thus set free combines with the mercury in the bottom of the vessel and forms an amalgam. By tilting the vessel back and forth this sodium amalgam is carried into the adjacent cell, where the sodium decomposes the water to form sodium hydrate, the amalgam in this cell being the anode and the carbon the cathode of a galvanic battery which generates electrical energy, and thus reinforces the energy supplied to the apparatus by the main source. Difficulty has been experienced in this process by reason of the fact that the metallic sodium thus supplied to the oxidizing-cell is insufficient to transmit the total current, and consequently the mercury becomes oxidized, and difficulties of operating result. In order to in a measure obviate this difficulty, it has been customary to provide a short-circuiting path outside the vessel from the carbon cathode to the mercury anode of the battery or oxidizing-compartment; but this is obviously a wasteful expedient, since the energy transmitted through the short circuit is not utilized in the reducing process.

In order to overcome the difficulties above indicated and to prevent the formation of oxid of mercury, I propose to employ a greater number of reducing-cells than oxidizing-cells and to distribute the amalgam formed in the reducing-cells among the less number of oxidizing-cells in such a manner that each oxidizing-cell shall have sufficient sodium to transmit the total current without oxidizing the mercury.

As a means for practicing my invention I have shown the apparatus illustrated in the accompanying drawings, in which—

Figure 1 is a plan view of three reducing and two oxidizing cells and the coöperating apparatus properly connected and arranged and combined with a source of electrical energy, such source and the conductors between the same and the battery-electrodes being diagrammatically illustrated. Fig. 2 is a detail sectional view of a reducing or an oxidizing cell, showing the electrodes in position therein. Fig. 3 is a diagrammatic sectional view of a series of four reducing-cells and two oxidizing-cells combined with a source of electrical energy.

As indicated in Fig. 1, all of the cells are shown as comprised in a single structure 1, this being a convenient arrangement. Obviously each cell or receptacle might be constructed separately from the others and connected by suitable troughs or channels without in any way modifying the invention in any substantial particular. As shown, each cell is provided with a plurality of bottom pockets or channels 2, three of these channels being indicated in each cell in the drawings, though any other number may be employed, if desired, and these channels are filled, or partially filled, with mercury 3. The channels extend at their ends beyond the sides 4 of the cells into outside channels 5, the mercury inside the cells extending above the bottom edges of the sides sufficiently to form a seal and prevent any outflow of the electrolyte 6. The addition of mercury, if desired, may be made in any one of these channels 5, the difference in level between the mercury in the outside channels and in the inside channels or pockets being determined by the weight of the electrolyte in the cell. Journaled in each cell is a shaft 7, provided with a suitable pulley 8, all of these pulleys being driven, if desired, by means of suitable belts from a single counter-shaft. (Not shown.) Rigidly mounted upon each shaft 7 is a plurality of amalgamated metal disks 9, preferably of copper and of such diameter as to dip into the mercury 3 in the corresponding channels 2. These disk electrodes are all electrically connected together by means of the shaft, so as to form, in effect, a single electrode and may be provided with curved grooves or channels 10 for the purpose of distributing the mercury evenly over their surfaces. Interposed between adjacent electrodes 9 are carbon or other electronegative electrodes 11, which are connected so as to constitute electrically a single electrode. Each cell may be provided with a cover 12, having a flange 13, that projects downward into the electrolyte, and with a pipe 14 for drawing off the gaseous products of electrolytic decomposition.

For convenience in describing the operation of the apparatus employed in practicing the method I will designate the first, second, and third reducing-cells, as shown in Fig. 1, as $a$, $b$, and $c$, respectively, and the first and second oxidizing-cells as $d$ and $e$, respectively. It will be observed that the outside channel 5 at one side of cells $a$ and $d$ is common to the two cells, so that the mercury or amalgam is free to flow from the cell $a$ into the cell $d$, and since it constitutes one electrode of each cell the electric current will be conducted by it from the electrolyte in cell $a$ to the electrolyte in cell $d$. In order to maintain a circulation of the amalgam without any conduction of the electric current from an oxidizing-cell to the next reducing-cell of the series, I provide transfer devices, which I have here indicated as wheels 15 of non-conducting material and provided with pockets, which dip into the amalgam as the wheel is rotated and transfer it in globules into the channel 5 corresponding to the next cell in the series. This transfer-wheel may be operated by means of a pulley 16, driven by a belt from a counter-shaft or by any other suitable operating means. The channel 5 at one side of cells $b$ and $e$ is common to these two cells, and therefore the mercury or amalgam flows from cell $b$ to cell $e$ and serves to conduct the current, as already described in connection with the channel corresponding to cells $a$ and $b$. The mercury flowing from cell $d$ to its channel 5 opposite that which is common to cells $b$ and $e$ is transferred by means of the transfer device 15 to the corresponding channel 5 at one side of the cell $c$, and the transfer of the amalgam from the channel at the other side of the cell $c$ to a channel or receptacle $5^a$ is made by means of another transfer device 15. From the channel or receptacle $5^a$ the amalgam may be returned to the channel 5 corresponding to the cell $a$ by means of a pipe 17 or other suitable conduit. This circulation of the amalgam is kept up continuously for any desired period, the electrolyte being maintained of proper strength in the reducing-cells by the addition of salt and water.

The electric current for effecting the electrolysis, as indicated, is supplied by means of a dynamo-electric generator 18, one of the poles of which is connected to the carbon electrodes in the cell $a$ and the other pole of which is connected to the mercury or amalgam in the channel 5 corresponding to the cell $c$.

In Fig. 3 I have shown diagrammatically the connection between the generator 18, four reducing-cells 19, and two oxidizing-cells 20, whereby the advantages of my process may be realized; but I have here indicated a single solid electrode 11 in each cell, the mercury 3 alone constituting the other electrode.

It will be understood that the invention is not limited to any specific form and arrangement of electrodes or receptacles, the form shown being merely indicative of any operatively useful construction.

I claim as my invention—

1. The method of treating a liquid electrolyte, which consists in electrolyzing the same in a plurality of cells having mercury cathodes and connected in series and subjecting the same mercury, as anodes, to electrochemical action in a less number of cells connected in series.

2. The method of treating a liquid electrolyte, which consists in electrolyzing it in a number of cells, in series, in which mercury constitutes the cathodes, subjecting the same mercury, as anodes, to electrochemical action in a less number of cells, in series, and transferring the mercury from cell to cell throughout the series.

3. The method of treating a liquid electrolyte, which consists in subjecting it to the action of an anode of electronegative material and a moving disk-shaped metal cathode coated with mercury in a stationary reducing-cell, in series with a stationary oxidizing-cell and a body of mercury moving freely between said cells.

4. The method of treating a liquid electrolyte, which consists in subjecting the same to the action of an electric current in a plurality of reducing-cells containing a mercury cathode, in series with a less number of oxidizing-cells containing mercury and an electrolyte, transferring the amalgam produced in each reducing-cell to the next oxidizing-cell uninterruptedly and transferring the amalgam from each oxidizing-cell to the next reducing-cell in the series in separated portions.

5. The method of treating a solution of sodium chlorid to produce sodium hydrate and chlorin which consists in subjecting the solution to the action of an electric current in a plurality of reducing-cells containing a mercury cathode, in series with a less number of oxidizing-cells, transferring the resulting amalgam, and with it the electric current, from each reducing-cell to the next oxidizing-cell in the series and transferring the amalgam from each oxidizing-cell to the next reducing-cell in the series without thereby transferring the electric current.

6. The method of producing sodium hydrate and chlorin from an aqueous solution of sodium chlorid which consists in subjecting the solution to electrolytic action by means of mercury cathodes and anodes of electronegative material in a plurality of reducing-cells, in series, subjecting the resulting amalgam to electrolytic action in a less number of oxidizing-cells, in series, and transferring the resulting amalgam from each cell to the next in the series.

In testimony whereof I have hereunto subscribed my name this 24th day of July, 1901.

CHARLES J. REED.

Witnesses:
J. C. MORSE,
BIRNEY HINES.